(12) United States Patent
Terpstra et al.

(10) Patent No.: US 8,582,560 B2
(45) Date of Patent: Nov. 12, 2013

(54) SYSTEM AND METHOD FOR ROUTING CALLS ASSOCIATED WITH PRIVATE DIALING PLANS

(75) Inventors: Rich Terpstra, Superior, CO (US); Richard Moore, Superior, CO (US)

(73) Assignee: Level 3 Communications, LLC, Broomfield, CO (US)

(*) Notice: Subject to any disclaimer, the term of this patent is extended or adjusted under 35 U.S.C. 154(b) by 967 days.

(21) Appl. No.: 12/362,923

(22) Filed: Jan. 30, 2009

(65) Prior Publication Data

US 2010/0195642 A1   Aug. 5, 2010

(51) Int. Cl.
H04L 12/66    (2006.01)

(52) U.S. Cl.
USPC .......................................................... 370/352

(58) Field of Classification Search
USPC ............... 370/356, 401, 352; 379/229, 88.22, 379/88.17
See application file for complete search history.

(56) References Cited

U.S. PATENT DOCUMENTS

| | | | |
|---|---|---|---|
| 6,122,255 A | 9/2000 | Bartholomew et al. | |
| 6,141,345 A | 10/2000 | Goeddel et al. | |
| 6,151,390 A * | 11/2000 | Volftsun et al. | 379/229 |
| 6,363,065 B1 | 3/2002 | Thornton et al. | |
| 6,430,282 B1 | 8/2002 | Bannister et al. | |
| 6,452,922 B1 | 9/2002 | Ho | |
| 6,510,219 B1 | 1/2003 | Wellard et al. | |
| 6,574,216 B1 | 6/2003 | Farris et al. | |
| 6,628,617 B1 | 9/2003 | Karol et al. | |
| 6,665,293 B2 | 12/2003 | Thornton et al. | |
| 6,754,181 B1 | 6/2004 | Elliott et al. | |
| 6,771,640 B2 | 8/2004 | Karamchedu et al. | |
| 6,826,272 B1 | 11/2004 | Dalrymple et al. | |

(Continued)

FOREIGN PATENT DOCUMENTS

| CN | 1421081 A | 6/2003 |
|---|---|---|
| CN | 1698328 A | 11/2005 |

(Continued)

OTHER PUBLICATIONS

Notification of Transmittal of the International Search Report and Written Opinion of the International Searching Authority from corresponding application PCT/US2010/021449 ; International Search Report and Written Opinion included, mailed Mar. 23, 2010.

(Continued)

Primary Examiner — Asad Nawaz
Assistant Examiner — Parth Patel

(57) ABSTRACT

A method for routing a call associated with a private dialing plan includes receiving a call directed to a destination endpoint associated with a private dialing plan (PDP), receiving an internal egress path identifier associated with the destination endpoint, and routing the call to an egress path identified by the egress path identifier. A system for routing a call including a destination number associated with a PDP including a routing engine operable to route the call to a PDP call resolution server, and a first switch operable to receive an egress path identifier and a PDP telephone number from the PDP call resolution server, the egress path identifier identifying an egress path for routing the call to a destination endpoint associated with the destination number, and the PDP telephone number identifying a selected PDP destination endpoint and a second switch operable to receive the call based on the egress path identifier and route the call to the selected PDP destination endpoint using the PDP telephone number.

17 Claims, 6 Drawing Sheets

(56) References Cited

U.S. PATENT DOCUMENTS

| | | |
|---|---|---|
| 6,940,849 B2 | 9/2005 | Eichen et al. |
| 6,973,504 B2 | 12/2005 | Nomura |
| 7,002,970 B1 | 2/2006 | Veschi |
| 7,113,500 B1 | 9/2006 | Bollinger et al. |
| 7,145,898 B1 | 12/2006 | Elliott |
| 7,215,643 B2 | 5/2007 | Mussman et al. |
| 7,263,096 B2 | 8/2007 | Yang et al. |
| 7,280,530 B2 | 10/2007 | Chang et al. |
| 7,283,519 B2 | 10/2007 | Girard |
| 7,330,463 B1 | 2/2008 | Bradd et al. |
| 7,379,471 B2 | 5/2008 | Mitsumori et al. |
| 7,382,767 B2 | 6/2008 | Stumer |
| 7,466,710 B1 * | 12/2008 | Clemm et al. ............... 370/401 |
| 7,515,583 B2 | 4/2009 | Kamani et al. |
| 7,570,632 B2 | 8/2009 | Mussman et al. |
| 7,599,351 B2 | 10/2009 | Gallant et al. |
| 7,796,581 B1 * | 9/2010 | Rangarajan et al. .......... 370/352 |
| 7,860,114 B1 * | 12/2010 | Gallant et al. ................ 370/401 |
| 2001/0003522 A1 | 6/2001 | Masuhiro |
| 2002/0122547 A1 | 9/2002 | Hinchey et al. |
| 2003/0046400 A1 | 3/2003 | Friel et al. |
| 2003/0059005 A1 | 3/2003 | Meyerson et al. |
| 2003/0095542 A1 | 5/2003 | Chang et al. |
| 2004/0022237 A1 * | 2/2004 | Elliott et al. ................... 370/356 |
| 2007/0041527 A1 * | 2/2007 | Tuchman et al. ........... 379/88.22 |
| 2008/0232558 A1 * | 9/2008 | Pinckney ................... 379/88.17 |

FOREIGN PATENT DOCUMENTS

| | | |
|---|---|---|
| CN | 101076132 A | 11/2007 |
| JP | 8-195813 | 7/1996 |
| JP | 2000-253144 | 9/2000 |

OTHER PUBLICATIONS

"International Preliminary Report on Patentability and Written Opinion dated Aug. 11, 2011", PCT/US10/021449, filed Jan. 20, 2010, 7 pgs.

U.S. Appl. No. 12/534,737, filed Aug. 3, 2009 to Mussman et al.

Chinese Examination Report, dated Jan. 30, 2013, Application No. 2010-80014367.9, 24 pgs.

Japanese Examination Report, dated Jan. 29, 2013, Application No. 2011-548059, 2 pgs.

Korean Examination Report, dated Nov. 20, 2012, Application No. 2011-7020169, 9 pgs.

Korean Examination Report, dated Jun. 21, 2013, Application No. 2011-7020169, 4 pgs.

Canadian Examination Report, dated Jul. 24, 2013, Application No. 2,751,128; 2 pgs.

* cited by examiner

SYSTEM AND METHOD FOR ROUTING CALLS ASSOCIATED WITH PRIVATE DIALING PLANS

COPYRIGHT NOTICE

Contained herein is material that is subject to copyright protection. The copyright owner has no objection to the facsimile reproduction of the patent disclosure by any person as it appears in the Patent and Trademark Office files or records, but otherwise reserves all rights to the copyright whatsoever. Copyright © 2008 Level 3 Communications, LLC.

TECHNICAL FIELD

Embodiments presently disclosed generally relate to terminating a call. More specifically, embodiments herein relate to terminating a call to a network implementing a private dialing plan.

BACKGROUND

In the field of telecommunications, a call placed from an originating endpoint to a destination endpoint generally is setup through a number of networks. These networks typically include a terminating carrier network and an intermediate carrier network and may include others. The terminating carrier network finalizes the connection to the destination endpoint. The intermediate carrier network may be a wholesale carrier network that provides network service to retail communications service providers such as toll-free service providers, Tier 2 or Tier 3 service providers, enterprise networks, or others. Challenges arise in directing a call to the destination endpoint if the endpoint has a telephone number that is part of a private numbering plan.

For example, when a toll-free call is placed, the call must typically be routed to an appropriate automatic call distributor (ACD) which has a telephone number that is part of a private dialing plan (PDP). In order to route the call, a network can obtain dialed number identification service (DNIS) number associated with an ACD at a toll-free service provide call center. Although the DNIS has meaning within the toll-free service provider network, the DNIS typically does not have meaning to another carrier network that is attempting to route the call to the toll-free service provider call center. As such, problems exist with respect to routing calls that are directed at an endpoint having a number associated with a private dialing plan.

SUMMARY

Embodiments presently disclosed generally relate to voice communications and services. More specifically, embodiments herein relate to routing calls associated with a private numbering plan. Some embodiments relate to routing a call to a destination endpoint by routing the call over an egress path identified by an egress path identifier in a call signature. Internal egress path identifiers can be provided to a private dialing plan (PDP) call resolution service to allow the PDP call resolution service to select an internal egress path for routing the call.

An embodiment of a method for establishing a call associated with a private dialing plan includes receiving a call directed to a destination endpoint associated with a private dialing plan (PDP), receiving an internal egress path identifier associated with the destination endpoint, and routing the call to an egress path identified by the egress path identifier. The method may further include routing the call to a PDP call resolution service operable to determine the egress path identifier based at least in part on a dialed number in the call. The internal egress path identifier may include a routing number (RN). Receiving the internal egress path identifier may include receiving the internal egress path identifier on a PDP-enabled trunk. The internal egress path identifier may be encoded in a message that has a format that may be Session Initiation Protocol (SIP), Signaling System 7 (SS7), Channel Associated Signaling (CAS) and Primary Rate Interface (PRI).

Further still, a PDP telephone number corresponding to the destination endpoint is further encoded in the message. The method may further include a core routing engine ignoring the PDP telephone number of the message and determining that the call should be routed according to the RN. The method may further include providing the PDP call resolution service with a list of one or more internal egress path identifiers associated with numbers in the PDP. The PDP-enabled trunk may be dedicated to the PDP. The call may be established over a single calling leg.

An embodiment of a computer-implemented method for establishing a call from a first network to a second network, in which the call is directed to a destination telephone number associated with a private dialing plan (PDP), includes querying a PDP call resolution service operable to select an internal egress path identifier from a plurality of internal egress path identifiers associated with telephone numbers of the PDP, receiving the selected internal egress path identifier from the PDP call resolution service, and routing the call to a destination endpoint associated with the destination telephone via the egress path identified by the selected internal egress path identifier. The first network may include a first Private Branch Exchange (PBX) and the Second network may include a second PBX. Alternatively or in addition, the call may be a toll-free call, and the second network may include a toll-free service provider network. The PDP call resolution service may reside in a third network.

In an embodiment of the computer-implemented method querying the PDP call resolution service may involve querying a core routing engine configured to resolve the PDP call. The steps of querying and routing may involve establishing a single calling leg.

In an embodiment of the computer-implemented method querying may involve establishing a first leg of the call and routing involves establishing a second leg of the call.

An embodiment of a system for routing a call including a destination number associated with a private dialing plan (PDP), includes a routing engine operable to route the call to a PDP call resolution server, a first switch operable to receive an egress path identifier and a PDP telephone number from the PDP call resolution server, the egress path identifier identifying an egress path for routing the call to a destination endpoint associated with the destination number, and the PDP telephone number identifying a selected PDP destination endpoint, and a second switch operable to receive the call based on the egress path identifier and route the call to the selected PDP destination endpoint using the PDP telephone number. The egress path identifier may include a Plain Old Telephone System (POTS) Number. The POTS Number may correspond to an internal Routing Number.

The system may further include a PDP-enabled trunk coupling the first switch to the PDP call resolution server. The egress path identifier may be encoded in a format, which may be a Session Initiation Protocol (SIP) format, a Signaling System 7 (SS7) format, a Primary Rate Interface (PRI) format, or a Channel Associated Signaling (CAS) format. The system may also receive a PDP telephone number from the PDP call resolution server. The PDP telephone number may range from one to eighteen digits. The routing engine may be operable to ignore the PDP telephone number and determine that the POTS number corresponds to an internal switch associated with the identified egress path.

DETAILED DESCRIPTION

Figure 1:
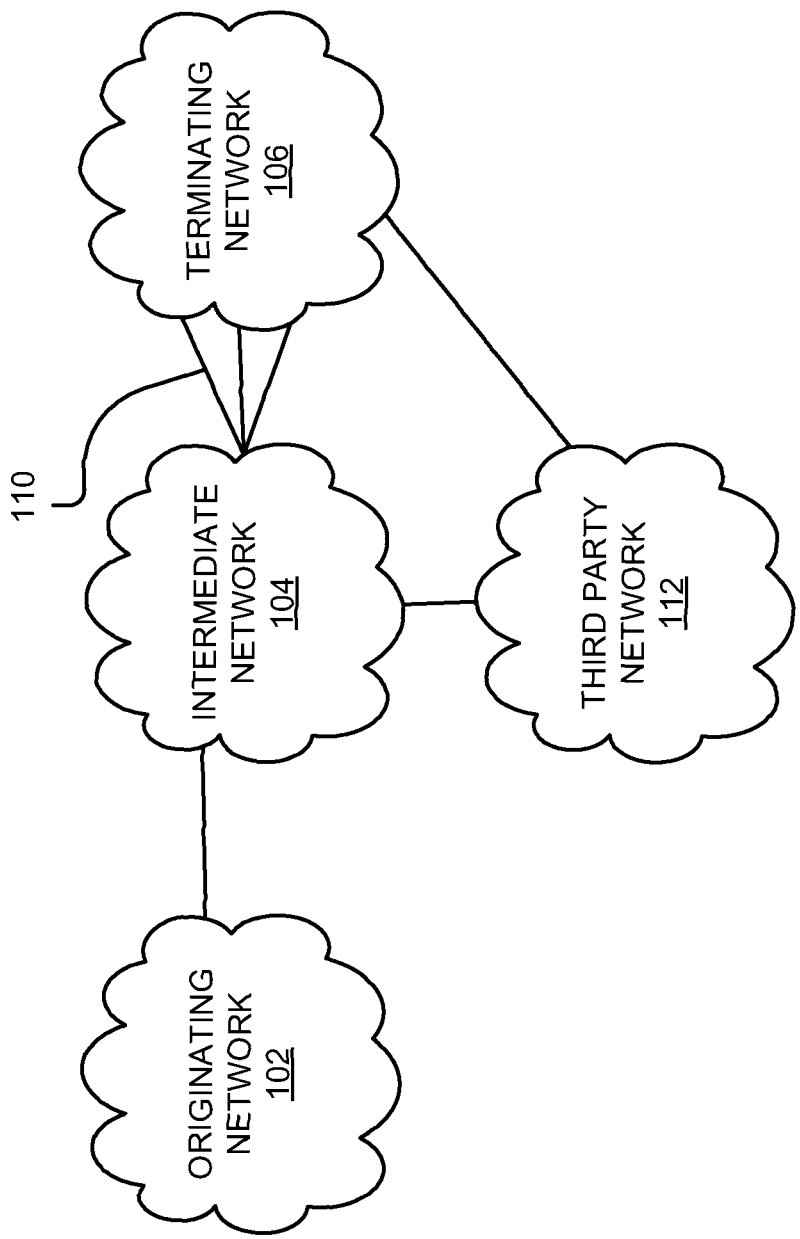
FIG. 1 illustrates an example network environment suitable for routing calls to an endpoint associated with a private dialing plan (PDP) in accordance with one embodiment.

FIG. 1 illustrates an example network environment suitable for routing calls to an endpoint associated with a private dialing plan (PDP). An endpoint is any communication device, such as, but not limited to a telephone or softphone (e.g., a telecommunications enabled computer), and which may be portable, and may or may not be an Internet protocol (IP)-based communication device. A private dialing plan, or private numbering plan, is a phone numbering plan that defines the format of phone numbers used within a private phone system. Often, a phone call received in a network having a PDP can be routed to multiple endpoints.

In general, calls originate from originating endpoints communicatively coupled to an originating network 102. The originating network 102 is not necessarily the initial network that the call goes through, but from the perspective of the intermediate network 104, the call originates from the originating network 102. For example, the call from the originating endpoint could traverse one or more networks (e.g., a Local Exchange Carrier (LEC) network). The call includes signaling that requests that a media channel be setup to conduct a call between the originating endpoint and a destination endpoint. As discussed further, the call may be a toll-free call to a toll-free service provider, an inter-PBX call, or other call to a destination endpoint that is part of a private numbering plan (e.g., private dialing plan (PDP)).

A call is routed to the intermediate network 104, which determines how to route the call to a terminating network 106. The intermediate network 104 may be coupled to a number of egress paths 110 that can be used by the intermediate network 104 to route the call to an endpoint associated with the terminating network 106. For example, if the terminating network 106 has an associated PDP, there may be multiple possible endpoints that a call could be routed to, and therefore, multiple possible egress paths 110 that the intermediate network 104 could select from to route the call to an endpoint.

In some cases, the egress paths 110 may each be coupled to a particular location or endpoint of the terminating network 106, and, depending on the call, one egress path 110 may be preferred over the other paths. In some embodiments, if a call needs to be routed to the terminating network 106, the intermediate network 104 routes the call first to a third party network 112 which is configured to provide a PDP call resolution service. As discussed further below, some embodiments do not use a third party network for resolving the PDP call to a particular egress path.

In embodiments that use a PDP call resolution service, the PDP call resolution service selects an egress path 110 from among multiple egress paths 110 on which to route the PDP call. In an embodiment, the PDP call resolution service is operable to provide an egress path identifier identifying the selected egress path 110, based on information about the call, information about the endpoints of the terminating network 106 and/or other information.

The intermediate network 104 receives the egress path identifier from the third party network 112 and uses the egress path identifier to route the call to the terminating network 106. The egress path identifier may be a number that is unique within the intermediate network 104 such that the number can be used to direct the call to an associated egress path 106. In some embodiments, the egress path identifier includes a Plain Old Telephone System (POTS) number corresponding to a Local Routing Number to a switch in the intermediate network 104. Two example embodiments are described with reference to a toll-free call service provider and private branch exchanges, in reference to FIG. 2 and FIG. 3, respectively.

Figure 2:
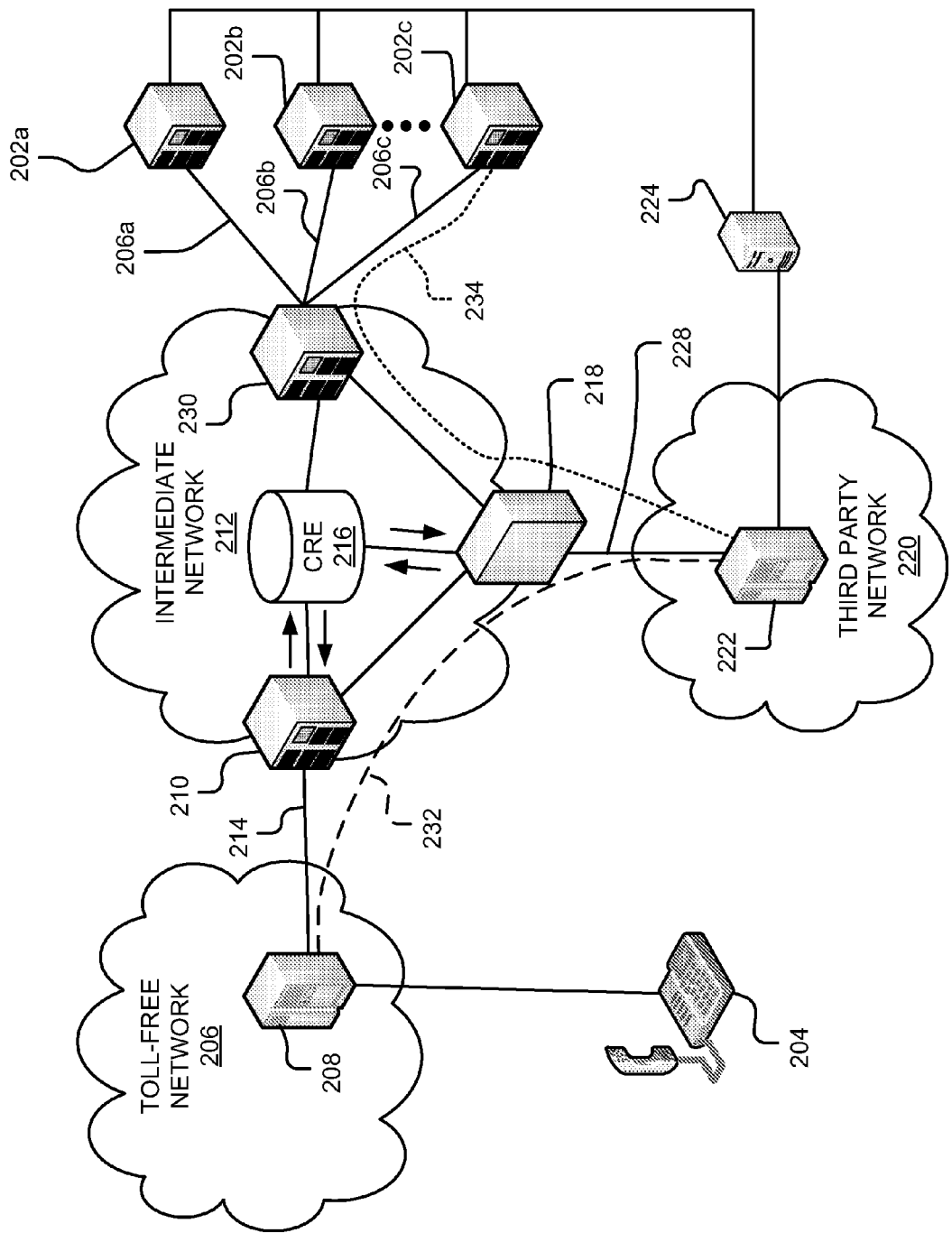
FIG. 2 illustrates an example network environment for carrying out PDP call routing in accordance with the embodiment of FIG. 1.

FIG. 2 illustrates a network environment suitable for routing a PDP call (i.e., a call having a destination number associated with a PDP) according to a particular embodiment, in which a toll-free call is placed at the originating endpoint, and the call is to be serviced by a toll-free service center. In the illustrative environment of FIG. 2, the terminating network is composed of multiple Automatic Call Distributors (ACDs) 202, which are configured to distribute toll-free calls to appropriate endpoints, such as live agents, operators or Interactive Voice Response (IVR) systems.

In the depicted embodiment, two call legs are established to route the PDP call: a first call leg 232 and a second call leg 234. To illustrate, a toll-free call is placed by originating endpoint 204. The call enters a toll-free network 206, which in one embodiment is a circuit-switched network that routes toll-free calls. The toll-free call is received at a switch 208. In one embodiment, switch 208 is a digital multiplex system (DMS) switch. Switch 208 routes the call to another switch 210 of the intermediate network 212, via a link 214. Link 214 may be, for example, a Time Division Multiplexing (TDM) trunk.

In one embodiment, intermediate network 212 is a Voice Over Internet Protocol (VoIP) network. Intermediate network 212 may be a wholesale carrier network that provides carrier service to other network service providers. Switch 210 may be a soft switch that queries a core routing engine (CRE) 216 to determine an appropriate route for the call. In the illustrated scenario, the CRE 216 is configured to direct toll-free calls, such as the received call, to a network border switch (NBS) 218 that interacts with a third party network 220 that can resolve termination of the call.

Third party network 220 provides a PDP call resolution service. In one embodiment, third party network 220 includes a call resolution server 222 operable to receive the dialed toll-free number, from the intermediate network 212 and resolves the toll-free number to a PDP telephone number (TN). In one embodiment, the call resolution server queries a PDP information server 224 for information about the ACDs 202. Based on the information from the information server 224 and the toll-free call, the server 222 returns an egress path 206 identifier to the NBS 218 and the PDP TN. As discussed further below, the intermediate network 212 includes the PDP TN in the outgoing call signature to direct the call to the selected endpoint of the toll-free service provider PDP.

With further regard to the call resolution server 222, in one embodiment, the server 222 is configured with egress path 206 identifiers. The egress path identifiers can be Plain Old Telephone System (POTS) numbers that correspond to internal routing numbers (RNs) of the intermediate network 212. In one embodiment, a provisioning interface of the intermediate network 212 shares the POTS numbers with the third party network 220. For example, the server 222 may be furnished with POTS numbers that map to terminating network interconnections of a switch 230, which is configured to route calls to the egress paths 206. The RNs are provisioned onto switch 230 as subscriber numbers associated with ACDs 202.

The call resolution server 222 maintains associations between egress path 206 identifiers and endpoints, such as ACDs 202, associated with the PDP. The associations may be maintained, for example, in a table in memory. When the call resolution server 222 receives a PDP call from the NBS 218, the table is indexed with an ACD 202 identifier to determine the appropriate egress path 206.

Furthermore, in at least one embodiment, the call resolution server 222 is operable to gather further information about the toll-free call in order to resolve the call to a preferred ACD 202. For example, in one embodiment, the call resolution server 222 includes Interactive Voice Response (IVR) functionality, which enables the call resolution server 222 to receive information from the originating endpoint 204. The IVR function could prompt the user of the originating endpoint 204 to indicate parameters about the toll-free call. For example, the user could be prompted to indicate a particular service or product, a subscriber identifier (e.g., name, social security number, etc.), account information, skills preference, or others. Such additional information is used by the call resolution server 222 to select an appropriate ACD 202 to service the toll-free call. The selected ACD 202 may be an ACD associated with an agent who is available to service the toll-free call.

In one embodiment, the PDP information server 222 assigns a call record to the toll-free call. The call record may be an alphanumeric key. For example, the key may be a 4 or 5 digit number. The key is used as a DNIS. The key can be included in the call signature, for example, in an SS7 Initial Address Message (IAM), to the selected ACD 202. The key may also be used as a customer record. Embodiments may be able to work with SS7, SIP, Primary Rate Interface (PRI) and Channel Associated Signaling (CAS) endpoints. The key may be adapted according to the particular signaling protocol being used.

After the call resolution service determines the appropriate ACD 202, the call resolution service looks up an egress path identifier associated with the determined ACD 202. In one embodiment, the egress path identifiers are Plain Old Telephone System (POTS) numbers that correspond to internal Routing Numbers (RNs) of the intermediate network 212. The internal routing numbers are not published in the Local Exchange Routing Guide (LERG). As such, the internal RNs are private to the intermediate network 212. The call resolution service generates a message including the POTS number associated with the selected ACD 202. The message sent from the call resolution service may be in any format, depending on the protocol used. For example, the message may be an SS7 message, a SIP message or other message.

In one embodiment, the message is a Session Initiation Protocol (SIP) INVITE message that includes a DNIS identifying the selected ACD 202 and the POTS corresponding to the egress path 206 configured to route the call to the selected ACD 202. The message may also include a parameter that indicates that the called number has been checked for local number portability. The format of a SIP INVITE message is shown here:

INVITE 12345@domain npdi=yes rn=+17208885555

In the above message, INVITE is the SIP message name, 12345@domain is a DNIS, npdi (number portability dip indicator) is an indicator that the number has been checked (i.e., dipped) for portability, and rn (routing number) can be a local routing number (LRN) internal to the intermediate network. The value "12345" is a 5 digit key that can be assigned to the call by the PDP information server that is used for identifying the call and/or the customer at the toll-free service provider. The internal RN provided by the call resolution service is not publicized by the intermediate network 212. As indicated above one or more internal RNs are provided to the PDP call resolution service of the third party network 220 for purposes of routing PDP calls.

The NBS 218 receives the SIP INVITE message from the third party network 220 over a PDP-enabled trunk 228. The PDP-enabled trunk 228 is configured with digit manipulation rules that specify how numbers of a call are to be treated. According to the rules, the RN of the call received over trunk 228 replaces the ported dialed number and the ported dialed number is inserted into the original called number (OCN) field. The NBS 218 queries the CRE 216 with the RN. The CRE 216 is configured to recognize that the call was received on the PDP-enabled trunk 228 and route the call based on the POTS number in the "rn" field of the call signature The NBS 218 then routes the call to the switch 230, which has been provisioned with the internal RN corresponding to the POTS number, and is configured to transmit the call over the appropriate egress path 206. Routing through the switch 230 establishes the second leg 234 of the call. In one embodiment, the egress paths 206 are TDM trunks or direct access links (DALs) coupled to respective ACDs 202. The switch 230 and/or the egress paths 206 are configured with digit manipulation rules that specify how numbers of the call are to be treated. In one embodiment, according to the rules, the PDP TN received from the PDP resolution server 222 is re-inserted into the ported dialed number field, thereby making the PDP TN available to the ACD 202. In one embodiment the PDP TN corresponds to a DNIS number that can be used as a Primary Rate Interface (PRI) setup message at the receiving ACD 202.

Figure 3:
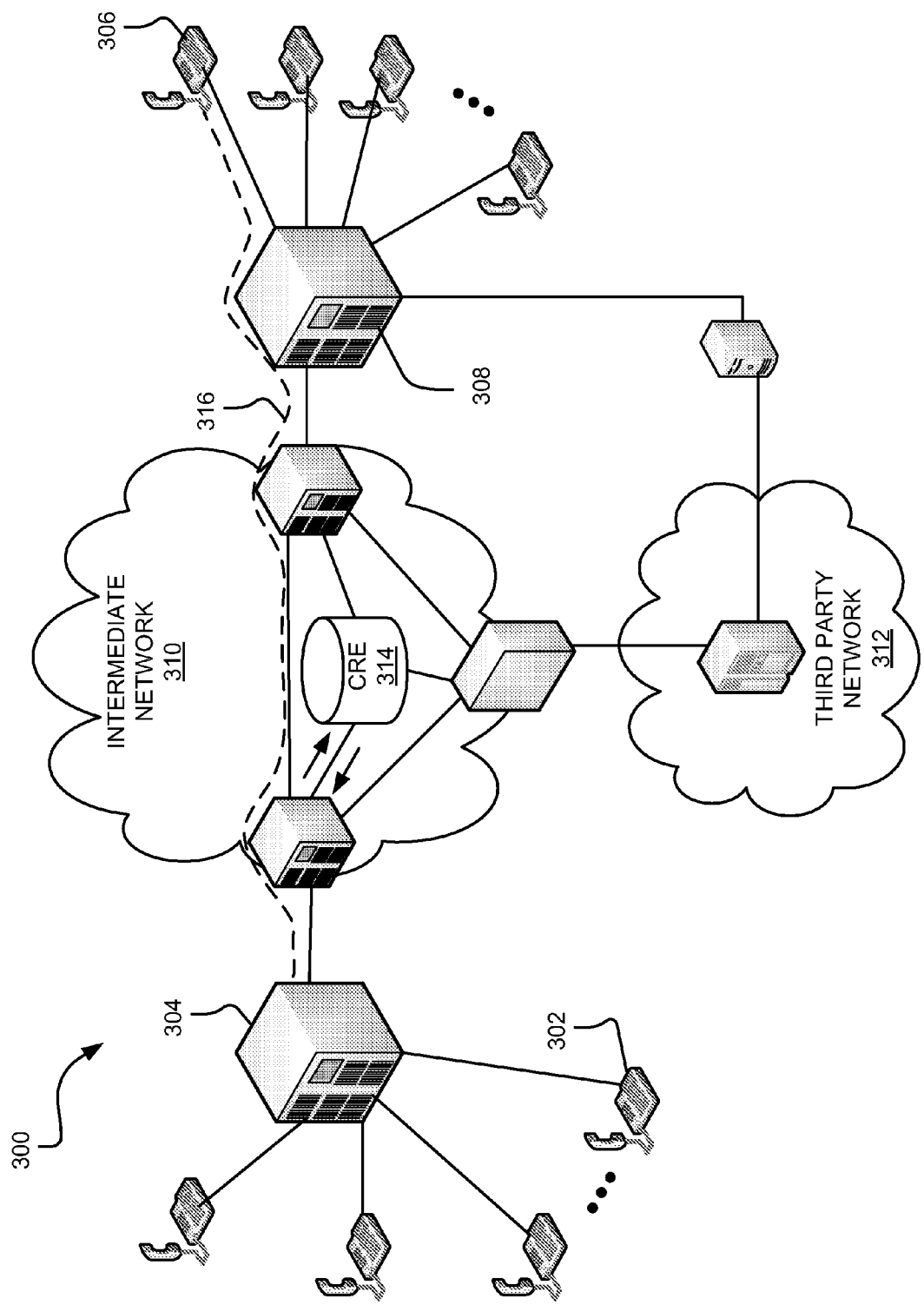
FIG. 3 illustrates another example network environment for carrying out PDP call routing in accordance with the embodiment of FIG. 1.

FIG. 3 illustrates another example network environment 300 for carrying out PDP call routing in accordance with the embodiment of FIG. 1. The embodiment of FIG. 3 illustrates inter-PBX routing of PDP calls. The embodiment illustrated in FIG. 3 may be applied to private dialing plans in a SIP, Signaling System 7 (SS7) or other environment. As is discussed further below, the embodiment of FIG. 3 may or may not use a third party network 312 to route PDP calls between PBX's. When a third party network 312 is not used, the PDP call can be setup with a single calling leg.

In the example environment 300, one or more first communication endpoints 302 are configured to communicate via a first PBX A 304 and one or more second communication endpoints 306 are configured to communicate via PBX B 308. An intermediate network 310 routes calls between PBX A 304 and PBX B 308. PBX A 304 and PBX B 308 may be part of an enterprise network.

In an illustrative scenario, PBX A 304 receives a call from one of its endpoints 302 as follows: 71234. PBX A 304 is configured to recognize that '7' maps to a PSTN number of, for example, 720-555-1234. PBX A 304 sends the call to PSTN/DAL with 720-555-1234 as the dialed number and 71234 as the original called number. In other words, the signature of the call from the PBX A 304 indicates that 720-555-1234 is the dialed number and 71234 is the original called number. In SIP this call format corresponds to an Invite with a Request Uniform Resource Identifier (R-URI) of +1720-555-1234 and a TO header of 71234. In SS7, this call format corresponds to an Initial Address Message (IAM) with a Called Party Number of 720-555-1234 and an original called number (OCN) of 71234.

In one embodiment, the intermediate network 310, which may be the PSTN or other closed network, includes a CRE 314 which receives queries and is configured to resolve PDP calls to a PDP TN and an egress path identifier. In this embodiment, the intermediate network 310 routes the call to PBX B 308 based on the 720-555-1234 number. When PBX B 308 receives the call, PBX B 308 reads the OCN or TO to determine which endpoint is the target for the call. PBX B 308 uses a different PSTN number to send calls back to PBX A 304. In this manner, a private dialing plan call is established between PBX A 304 and PBX B 308 using a single calling leg 316 through the intermediate network 310. The private numbers can overlap between Customers as long as the 10-digit TNs are unique to each PBX.

In another scenario, the third party network 312 is queried by the intermediate network 310 for a route to one or the endpoints 306. In this embodiment, two call legs are established in a manner similar to that described above with respect to FIG. 2.

Figure 4:
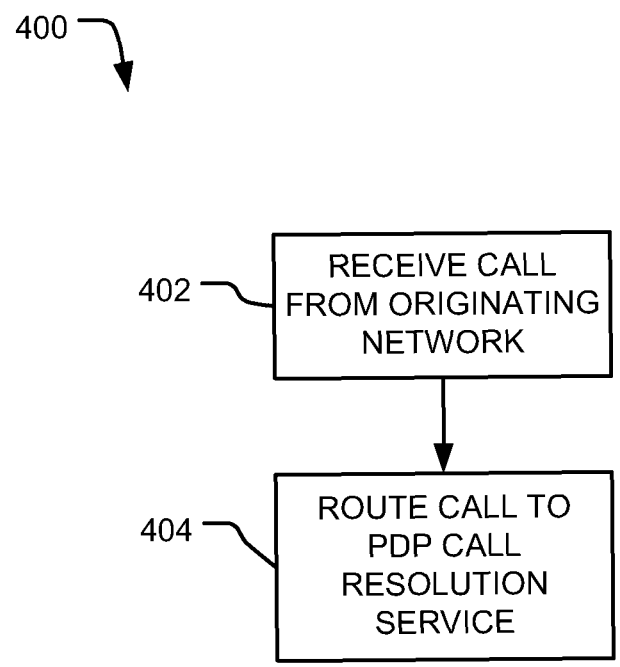
FIG. 4 is a flowchart illustrating an example method for setting up a first leg of a PDP call according to various embodiments.

FIG. 4 is a flowchart illustrating an example process 400 for setting up a first leg of a PDP call according to various embodiments. In one embodiment, the process 400 is carried out by one or more switches and a core routing engine. In a receiving operation 402 the switch receives the call requesting that a call be set up to a destination endpoint identified by a destination telephone number in the call.

In a routing operation 404, the CRE indicates that the call should be routed to a PDP call resolution server, which can resolve the PDP call to a particular egress path to the destination endpoint.

Figure 5:
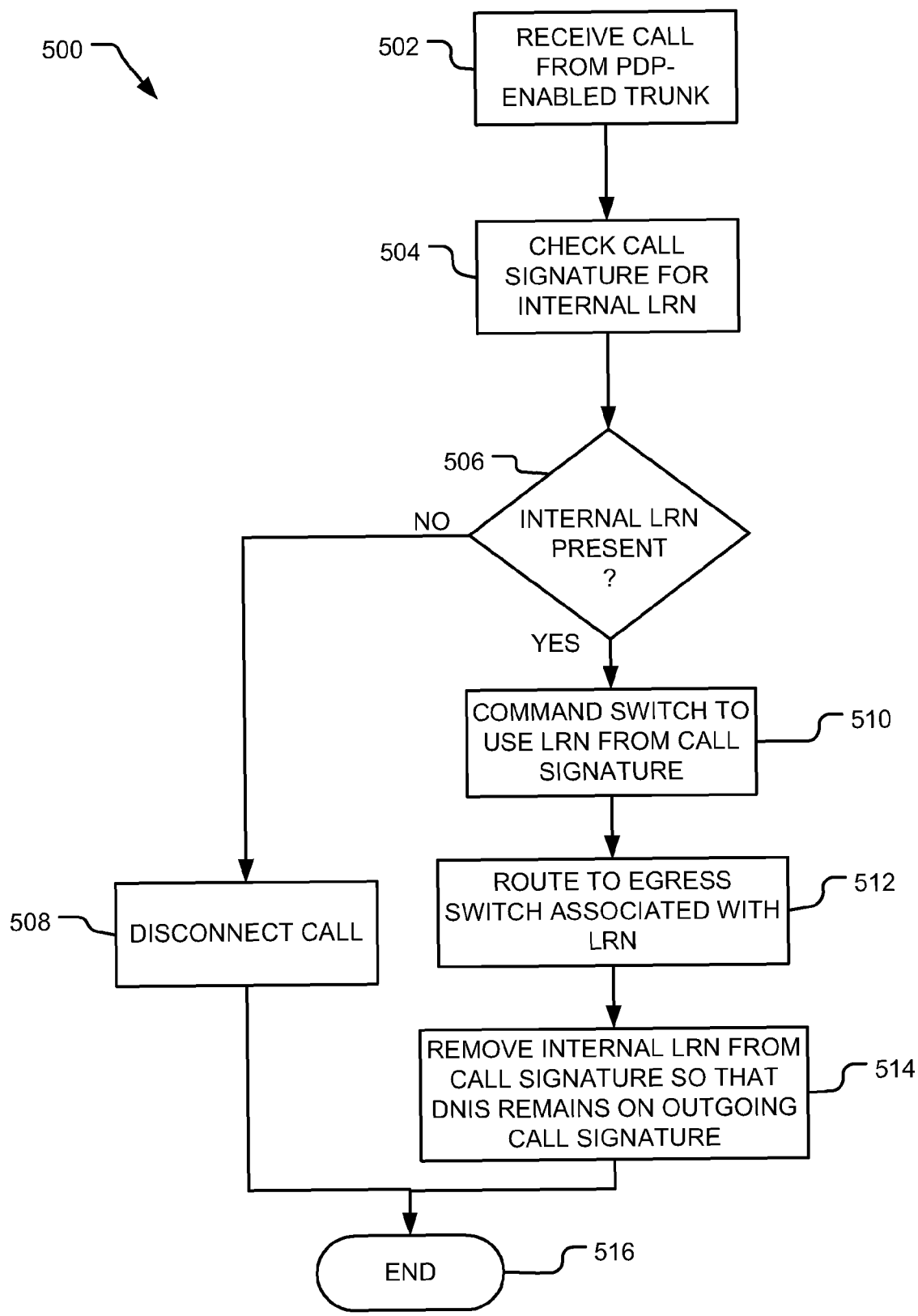
FIG. 5 is a flowchart illustrating an example method for setting up a second leg of a PDP call according to various embodiments.

FIG. 5 is a flowchart illustrating an example process 500 for setting up a second leg of a PDP call according to various embodiments. In one embodiment, the process 500 is carried out by one or more switches and a core routing engine. In a receiving operation 502 a network switch receives a call setup request from the PDP call resolution service, which may be from a third party network. The call is received over a PDP-enabled trunk, which is dedicated to PDP calls. In this embodiment, the call is a SIP INVITE message; however, in other embodiments, the call may be in another format, such as, but not limited to, SS7, PRI or CAS.

Assuming the message is a SIP format, the SIP INVITE message includes a number of fields, such as those shown above. A DNIS number corresponds to the PDP telephone number (i.e., the destination endpoint phone number in the private dialing plan). A portability check indicator indicates that the phone number has been checked for local number portability. A routing number corresponds to an internal RN configured to allow for routing the call to the destination number. In one embodiment, the SIP INVITE message is received by a network border switch (NBS). The NBS queries the core routing engine with information from the SIP INVITE message.

In one embodiment, the core routing engine is configured to recognize that call setup message was received on a PDP-enabled trunk dedicated to PDP call resolution. In a checking operation 504, the core routing engine checks parameters of the call signature. In a query operation 506, it is determined whether the routing number field of the call from the PDP call resolution service corresponds to an internal RN associated with a switch on the network. Because the call is received on the PDP-enabled trunk, the core routing engine is configured to ignore the DNIS number of the call.

If the routing number field of the call from the PDP call resolution service is not an internal RN, the process branches 'NO' to a disconnecting operation 508 where the call is disconnected. If, on the other hand, the routing number field of the call includes an internal RN the process 500 branches 'YES' to commanding operation 510. In commanding operation 510 the CRE instructs the NBS to route the call to the switch indicated by the routing number of the call.

In a routing operation 512, the call from the PDP call resolution service is routed to an egress switch associated with the RN in the call. The egress switch is configured to route the call to the appropriate trunk to direct the call setup request to the destination endpoint associated with the DNIS of the call. In one embodiment, the egress trunk is connected to a direct access link to the destination endpoint. In a removing operation 514, the RN of the call is removed so that the DNIS number remains in the outgoing call signature. The egress path (e.g., the egress switch and/or the egress trunk) is configured to remove the RN from the call signature.

After the internal RN is removed, the call is routed to the destination endpoint to establish the second leg of the PDP call. The process 500 ends at end operation 516. If the call was not disconnected in disconnecting operation 508, a media path is setup between the originating and destination endpoints.

Figure 6:
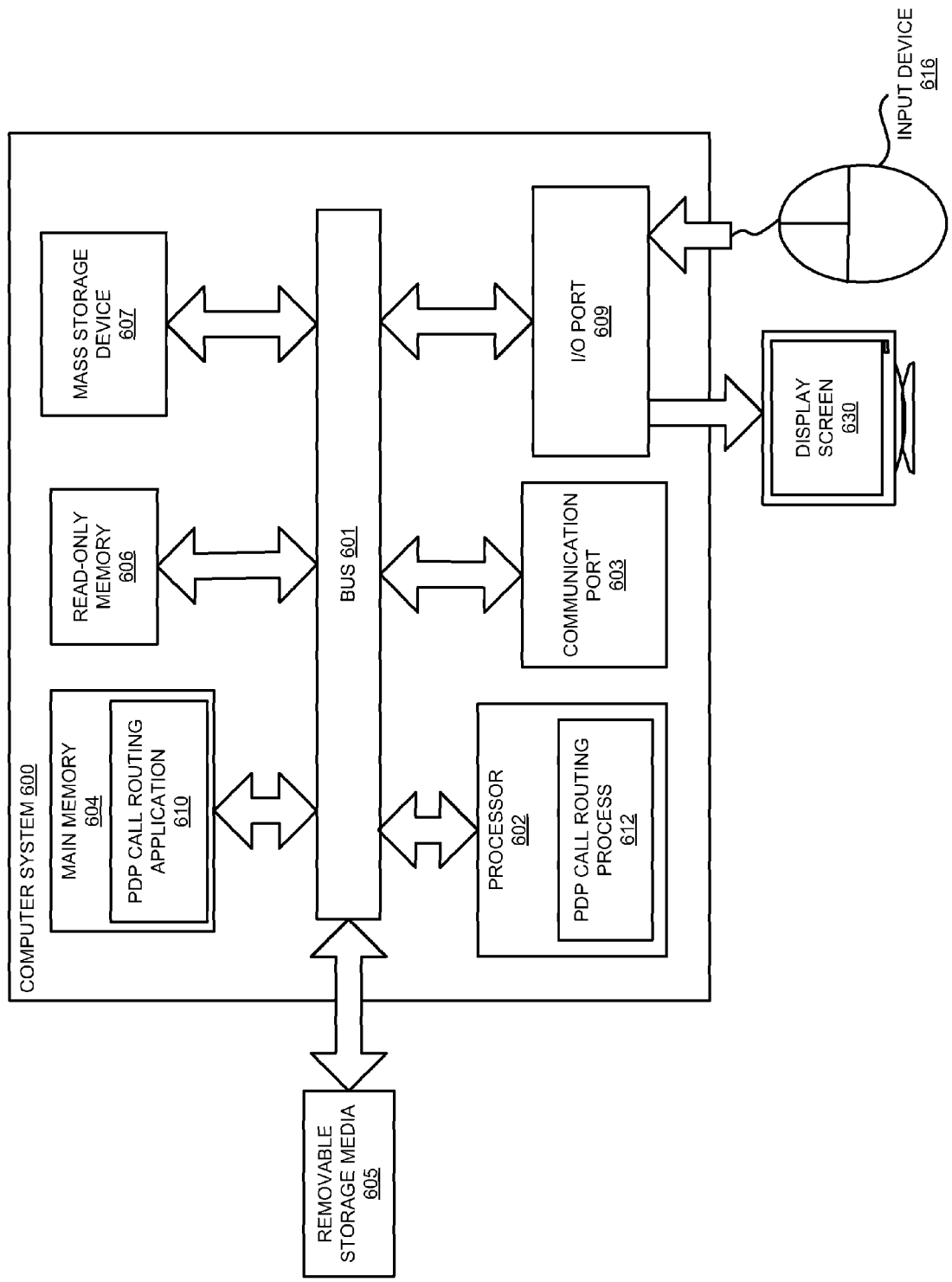
FIG. 6 illustrates a general purpose computing system that may be used to implement various embodiments of the present invention.

FIG. 6 is a schematic diagram of a computer system 600 upon which embodiments of the present invention may be implemented and carried out. Various embodiments may or may not employ all of the components of the illustrated computer system 600. The computer system 600 is an example of a type of computing device that could be used for a server or routing engine in various embodiments. For example, one or more computing devices 600 may be used to route calls to destination endpoints having numbers in a private dialing plan according to embodiments described herein.

According to the present example, the computer system 600 includes a bus 601 (i.e., interconnect), at least one processor 602, at least one communications port 603, a main memory 604, a removable storage media 605, a read-only memory 606, and a mass storage 607. Processor(s) 602 can be any known processor, such as, but not limited to, an Intel® Itanium® or Itanium 2® processor(s), AMD® Opteron® or Athlon MP® processor(s), or Motorola® lines of processors. Communications ports 603 can be any of an RS-232 port for use with a modem based dial-up connection, a 10/100 Ethernet port, a Gigabit port using copper or fiber, or a USB port. Communications port(s) 603 may be chosen depending on a network such as a Local Area Network (LAN), a Wide Area Network (WAN), or any network to which the computer system 600 connects. The computer system 600 may be in communication with peripheral devices (e.g., display screen 630, input device 616) via Input/Output (I/O) port 609.

Main memory 604 can be Random Access Memory (RAM), or any other dynamic storage device(s) commonly known in the art. Read-only memory 606 can be any static storage device(s) such as Programmable Read-Only Memory (PROM) chips for storing static information such as instructions for processor 602. Mass storage 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 601 communicatively couples processor(s) 602 with the other memory, storage and communications blocks. Bus 601 can be a PCI/PCI-X, SCSI, or Universal Serial Bus (USB) based system bus (or other) depending on the storage devices used. Removable storage media 605 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 604 is encoded with a PDP call routing application 610 that supports functionality as discussed above and as discussed further herein. The PDP call routing application 610 comprises computer-executable instructions that can be read and executed by the processor 602 to implement various aspects of PDP call routing. PDP call routing process 612 includes computer-executable instructions that have been read and are being executed by the processor 602. The PDP call routing application 610 may be stored on a computer readable medium (e.g., a repository) such as a floppy disk, hard disk or in an optical medium. According to other embodiments, the PDP call routing application 610 can also be stored in a memory type system such as in firmware, read only memory (ROM), or, as in this example, as executable code within the main memory 604 (e.g., within Random Access Memory or RAM). For example, PDP call routing application 610 may also be stored in removable storage media 605, read-only memory 606, and/or mass storage device 607.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for establishing a call associated with a private dialing plan, the method comprising:
    receiving a call directed to a destination endpoint associated with a private dialing plan (PDP);
    requesting an internal egress path identifier;
    routing the call to a PDP call resolution service operable to determine the internal egress path identifier based at least in part on a dialed number in the call;
    responsive to the requesting, receiving the internal egress path identifier from a call resolution server associated with the destination endpoint, wherein receiving the internal egress path identifier comprises receiving the internal egress path identifier on a PDP-enabled trunk, wherein the internal egress path identifier is encoded in a message, and wherein a PDP telephone number corresponding to the destination endpoint is further encoded in the message;
    a core routing engine ignoring the PDP telephone number of the message and determining that the call should be routed according to a routing number; and
    routing the call to an egress path identified by the internal egress path identifier.

2. The method of claim 1, wherein the internal egress path identifier comprises a routing number (RN).

3. The method of claim 1, wherein the message has a format selected from a group including Session Initiation Protocol (SIP), Signaling System 7 (SS7), Channel Associated Signaling (CAS) and Primary Rate Interface (PRI).

4. The method of claim 1, further comprising providing the PDP call resolution service with a list of one or more internal egress path identifiers associated with numbers in the PDP.

5. The method of claim 1 wherein the PDP-enabled trunk is dedicated to the PDP.

6. The method of claim 1, wherein the call is established over a single calling leg.

7. A computer-implemented method for establishing a call from a first network to a second network, wherein the call is directed to a destination telephone number associated with a private dialing plan (PDP), the method comprising:
    querying a PDP call resolution service operable to select an internal egress path identifier from a plurality of internal egress path identifiers, the selected internal egress path identifier associated with the destination telephone number of the PDP, wherein querying the PDP call resolution service comprises querying a core routing engine configured to resolve the PDP call;
    responsive to the query, receiving the selected internal egress path identifier from the PDP call resolution service, wherein receiving the internal egress path identifier comprises receiving the internal egress path identifier on a PDP-enabled trunk, wherein the internal egress path identifier is encoded in a message, and wherein a PDP telephone number corresponding to the destination endpoint is further encoded in the message;
    the core routing engine ignoring the PDP telephone number of the message and determining that the call should be routed according to a routing number; and
    routing the call to a destination endpoint associated with the destination telephone number via a egress path identified by the selected internal egress path identifier.

8. The computer-implemented method of claim 7, wherein the first network comprises a first Private Branch Exchange (PBX) and the second network comprises a second PBX.

9. The computer-implemented method of claim 7, wherein the call comprises a toll-free call, and wherein the second network comprises a toll-free service provider network.

10. The computer-implemented method of claim 7, wherein the PDP call resolution service resides in a third network.

11. The computer-implemented method of claim 7, wherein the querying comprises establishing a first leg of the call and wherein the routing comprises establishing a second leg of the call.

12. The computer-implemented method of claim 7, wherein the querying and the routing comprise establishing a single calling leg.

13. A system for routing a call including a destination number associated with a private dialing plan (PDP) where the routing is otherwise unknown and not available from the DNIS, the system comprising:
  - a routing engine operable to route the call to a PDP call resolution server, wherein the PDP call resolution server is operable to determine an egress path identifier based at least in part on a dialed number in the call;
  - a first switch, in communication with the PDP call resolution server, operable to receive the egress path identifier and a PDP telephone number from the PDP call resolution server in communication with a private dialing plan information server, the egress path identifier identifying an egress path for routing the call to a destination endpoint associated with the destination number, and the PDP telephone number identifying a selected PDP destination endpoint;
  - a PDP-enabled trunk coupling the first switch to the PDP call resolution server; and
  - a second switch operable to receive the call based on the egress path identifier and route the call to the selected PDP destination endpoint using the PDP telephone number;
  - wherein the egress path identifier is received in a message having a format,
  - wherein the message comprises the PDP telephone number and a Plain Old Telephone System (POTS) number, and
  - wherein the routing engine is operable to ignore the PDP telephone number and determine that the POTS number corresponds to an internal switch associated with the identified egress path.

14. The system of claim 13, wherein the egress path identifier comprises a Plain Old Telephone System (POTS) Number.

15. The system of claim 14, wherein the POTS Number corresponds to an internal Routing Number.

16. The system of claim 13, wherein the format is one of a Session Initiation Protocol (SIP) format, a Signaling System 7 (SS7) format, a Primary Rate Interface (PRI) format, or a Channel Associated Signaling (CAS) format.

17. The system of claim 16, wherein wherein the PDP telephone number ranges from one to eighteen digits.

\* \* \* \* \*